Oct. 1, 1957     H. J. LOVENSTON     2,807,882
GAGE UNIT
Filed Aug. 8, 1952
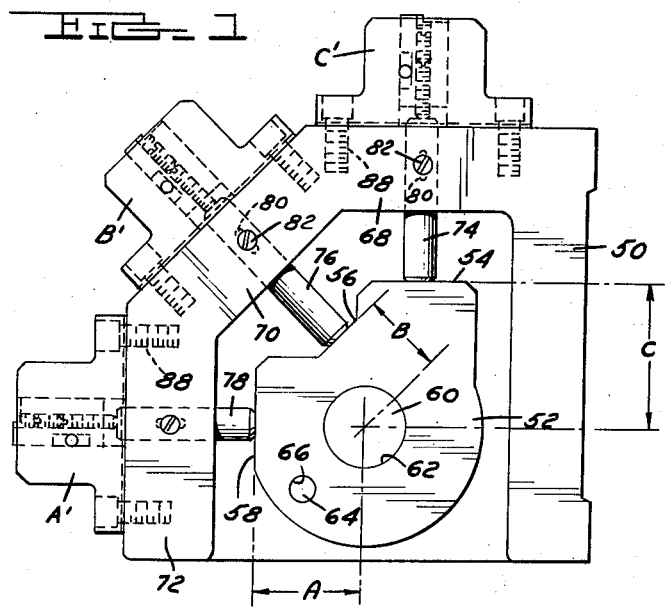
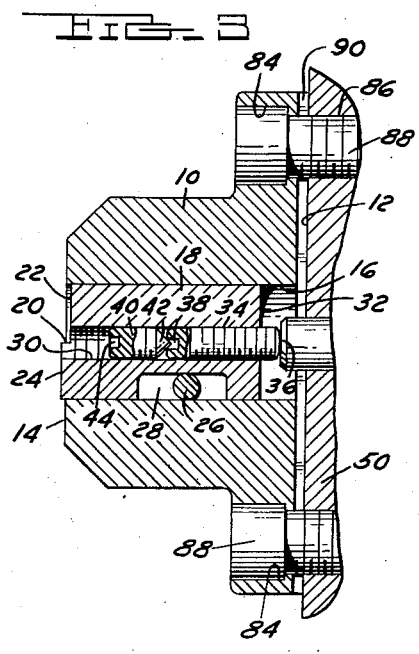
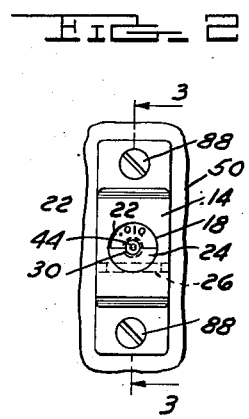
INVENTOR.
HANS J. LOVENSTON
BY
Barnes, Kisselle, Laughlin & Raisch
ATTORNEYS United States Patent Office 2,807,882
Patented Oct. 1, 1957

2,807,882
GAGE UNIT

Hans J. Lovenston, Detroit, Mich.; Bessie B. Lovenston, executrix of said Hans J. Lovenston, deceased, assignor, by mesne assignments, to Hanlo Gage Company, Detroit, Mich., a corporation of Michigan Application August 8, 1952, Serial No. 303,356

5 Claims. (Cl. 33—169)

This invention relates generally to gaging equipment known in the art as flush pin gages and more specifically relates to a basic gage unit adapted to be assembled with other gage units to provide a flush pin gage.

Flush pin gages are commonly constructed in either of two forms, namely, adjustable and non-adjustable. The non-adjustable type generally comprises a body having a through bore in which a flush pin slidably operates. The flush pin has a tolerance step at its upper end, and at its opposite or lower end the flush pin is arranged to contact the surface to be gaged by bringing the body of the gage into contact with a surface on the work piece the relation of which is to be gaged relative to another surface on the work piece which is contacted by the flush pin. Because of the peculiar shape or surface contour of many work pieces to be checked the necessity often arises for forming the body of the conventional flush pin gage with a particular surface contour to accommodate the work piece. This is obviously objectionable because gages so constructed are usually useless for gaging work pieces of different shapes.

Another objection to a flush pin gage of this type is that, if in the course of production of a work piece an engineering change is made which materially affects one or more critical dimensions of the work piece, then it may be necessary to rework the flush pin gage at considerable expense to accommodate the gage to the change in dimension of the work piece.

Flush pin gages of the adjustable type invariably have all of the adjusting features built directly into the gage itself or as part of a gage plunger extension to be used with the gage. Such gages of the adjustable type are usually quite expensive and the operation of initially adjusting such gages to the correct dimension to be gaged is usually quite an involved and time-consuming procedure.

It is an object of this invention to provide a basic gage unit adapted to be assembled with various types of gage bases or gage fixtures to provide a flush pin gage. Thus, the gage unit of this invention is interchangeable with various gage assemblies so that, although a particular gage assembly becomes obsolete for one reason or another, the gage unit itself may be removed from the assembly and used over and over again with other gage fixtures.

A further object of the invention resides in the provision of a self-contained gage unit possessing all the functional gaging features necessary for gaging requirements of flush pin gages.

Another object of the invention is to provide a simply constructed yet very durable gage unit having adjustment features which are effectively enclosed within the gage unit and which permit a relatively wide range of adjustment.

In the drawings:

Fig. 1 is a view showing the manner in which several gage units of this invention are employed in conjunction with a gaging fixture for gaging several different dimensions of an irregularly shaped work piece.

Fig. 2 is a top plan view of the gage unit of this invention as mounted on the fixture illustrated in Fig. 1.

Fig. 3 is a sectional view taken substantially along the lines 3—3 in Fig. 2.

Referring to the drawings and particularly to Fig. 3, the gage unit of this invention generally comprises a body 10 having a flat bottom surface 12 and a flat top surface 14 parallel to the bottom surface 12. A cylindrical bore 16 extends through the body 10 along a line perpendicular to the surfaces 12 and 14. Within bore 16 there is slidably arranged a pin 18 the end of which adjacent the surface 14 is provided with an accurately machined step 20 which divides the end face into spaced gaging surfaces 22 and 24. The adjacent surface 14 of the gage body also comprises a gaging surface.

A pin 26 in body 10 engages within a cut-away portion 28 at one side of pin 18 to prevent the pin 18 from rotating within bore 16 and also to limit the axial movement of pin 18 in bore 16. It will be observed that this arrangement of pin 26 and the cut-away portion 28 permits the gaging surfaces 22 and 24 on pin 18 to be shifted to a position either above or below the gaging surface 14 on body 10.

Pin 18 is also provided with a threaded opening 30 extending axially therethrough. Opening 30 terminates at one end at the gaging surfaces 22 and 24 and extends at its other end to the opposite end face 32 of pin 18. Within the threaded opening 30 there is arranged an adjusting screw 34 one end of which is rounded as at 36 and the other end of which is provided with a socket 38 for accommodating an Allen wrench or like tool for turning screw 34. Screw 34, it will be observed, is accessible through the end of opening 30 at gaging surfaces 22 and 24. Within opening 30 there is also threadedly arranged a screw 40 having a cone point 42 at one end and a socket or like means 44 at its other end for accommodating an Allen wrench or other turning tool. Screw 40 is in the nature of a locking screw for locking the adjusting screw 34 in a predetermined position of adjustment. The cone point 42 of screw 40 is admirably suited for this purpose, since it firmly engages the edges of the socket 38 of screw 34 when the screw 40 is advanced into a position abutting against the adjacent end of screw 34.

The unit thus far described is not in and of itself a gage, since pin 18 is not provided with a gaging surface adapted to be contacted with the surface of the work piece to be checked. The gage unit thus far described does, however, provide a basic unit which, when mounted on various types of bases or fixtures provided with gaging plungers, serves as a flush pin gage. As will be appreciated, the gage unit described is adapted for use with various types of bases or fixtures; and for the purpose of illustration, the unit is shown in Fig. 1 used in conjunction with a fixture generally designated 50. The fixture 50 is designed for gaging a workpiece 52 having accurately dimensioned faces 54, 56 and 58. Accordingly, the fixture 50 is provided with a pin 60 arranged to be received by an axial opening 62 on the work piece 52 for mounting the work piece in an axially aligned position on fixture 50. In addition, the fixture is provided with a locating pin 64 engageable with a cooperating opening 66 on work piece 52 for locating the work piece 52 in a fixed radial position on fixture 50.

Fixture 50, as is illustrated, is of generally U shape and is provided with base portions 68, 70 and 72 which are spaced from and generally parallel to the faces 54, 56 and 58, respectively, of the work piece 52 when mounted on the fixture. In each of these base portions there is slidably arranged a plunger. These plungers are indicated 74, 76 and 78, respectively. Each plunger is provided with an elongated slot 80 which engages with a screw or pin 82 to limit the axial movement of the plungers. Each plunger, it will be observed, is of sufficient length to extend from its respective gaging surface to the outer surface of its respective base portion. The body 10 of the gage unit is provided with spaced counterbored holes 84, and each of the base portions 68, 70 and 72 are provided with corresponding spaced, threaded sockets 86 which enable a plurality of the gage units described to be mounted on the fixture 50 in fixed rigid positions by means of screws 88. It will be observed that, when the gage units are mounted on the fixture 50 as shown, the plungers 74, 76 and 78 are disposed concentrically with respect to the bore 16 of the gage units. These plungers at their outer ends extend into the bore 16 and are arranged to be contacted by the rounded end 36 of the adjusting screw 34.

When it is desired to initially adjust the gage units on fixture 50 for gaging the dimensions A, B and C which correspond to the perpendicular displacement of the surfaces 58, 56 and 54, respectively, from the axis of the work piece, suitable gaging blocks (not shown) are employed in a conventional manner to obtain the proper setting of the plungers 74, 76 and 78 prior to the insertion of the work piece 52 in the fixture. Let us assume, for example, that gage blocks are arranged to correspond with the desired dimension C on the work piece. The gage blocks are arranged so that the top gaging surface of a series of gage blocks is disposed perpendicularly above the axis of pin 60 a distance corresponding to the desired dimension C of the work piece. Plunger 74 is then permitted to slide downwardly into engagement with the top gaging surface of these gage blocks. Thereafter, screw 40 is removed through the upper end of flush pin 18, and an Allen wrench or like tool is inserted through the open end of opening 30 into engagement with the socket 38. Screw 34 is then turned either in one direction or the other to bring the gaging surfaces 22 and 24 into the proper initial relation with respect to the gaging surface 14 on the body 10.

For example, if the tolerance of the dimension to be gaged is .010", then the perpendicular spacing between the gaging surfaces 22 and 24 will be .010". If the screw 34 is turned such that the top face 24 of pin 18 is flush with the gaging surface 14, then the gage is initially set to the low limit of the dimension; and if the screw 34 is adjusted so that the face 22 is flush with the face 14, then the gage is initially set at the high limit of the dimension. The setting of pin 18 to either the high limit, low limit, or mean dimension will be, of course, determined by the dimension originally produced by the gage blocks employed. The relationship between the gaging faces 22 and 24 with respect to the gaging surface 14 of the body 10 may be readily determined by simply running the thumb nail across the end of flush pin 18.

It will be appreciated therefore that the operation of adjusting the gage unit of this invention can be accomplished very simply and very quickly, since the relative disposition of the gaging surfaces on the pin 18 and body 10 can be continuously ascertained while the adjustment is being made by means of a suitable tool projecting through the open upper end of the pin 18. After the proper adjustment in this manner of each of the gage units, generally indicated A', B' and C', the adjusting screws 34 are locked in place by inserting the locking screws 40 in the openings 30 and threading them downwardly into engagement with the upper ends of the screws 38. The gage is thus conditioned for gaging work pieces.

With the gage unit of this invention it will be observed that, should one or more of the dimensions A, B and C of the work piece 52 be changed materially, such change in dimension will not render the gage obsolete. The range of adjustment of the gage unit is determined by the length the the screw 34 and by the length of the plungers 74, 76 and 78. If the dimensional change is greater than that which can be accommodated by the arrangement previously used, the gage may be adapted for gaging the new dimension by simply replacing the appropriate plunger 74, 76 or 78 with a new plunger of the appropriate length.

It will also be observed that, if during the course of production the tolerance of one of the dimensions A, B or C is changed, this change in tolerance simply requires removal of the corresponding flush pin 18 and its replacement with another flush pin having the tolerance step 20 of the appropriate size. For this reason, it is preferred to stamp on either the face 22 or face 24 of each flush pin the actual dimensional tolerance of the step 20 on that pin.

When the work piece 52 is mounted on the fixture 50, it can be readily determined whether the actual dimensions A, B and C of the work piece fall within the limits of the required dimensions. This can be ascertained by simply depressing each of the pins 18 so as to cause the corresponding plunger to engage the surface being gaged. Thereafter, when the thumb nail is moved across the surface 14 and the step surface at the end of pin 18, it can be determined whether the actual dimension of the work piece falls within the tolerance prescribed. In this connection it will be observed that, in order to prevent the formation of a completely enclosed air space in bore 16 between the inner end of pin 18 and the mounting face of fixture 50, the body 10 of each gage is provided with a slot 90 which permits air to be freely drawn into or exhausted from this space.

I claim:

1. A basic gage unit adapted for use with cooperating gage units having work contacting gaging members to provide a flush pin gage comprising a body having a through bore, a flush pin slidably operable in said bore and having an inner and outer end, said pin having a gaging surface at said outer end and being slidable in said bore to a position wherein said gaging surface projects outwardly beyond an adjacent gaging surface on the body, said pin having a threaded opening extending axially therethrough to the opposite ends of said pin, and an adjusting screw in said threaded opening, said screw being accessible through the end of said opening at said gaging surface of said pin to enable adjustment thereof axially of said threaded opening to a position wherein the end of the screw projects a desired distance beyond the inner end of said pin and including a second screw in said opening disposed between said first mentioned screw and said outer end of said pin, said second screw being accessible from said outer end of said pin through said threaded opening so as to be advanced into engagement with the adjacent end of said first mentioned screw to lock said first mentioned screw in adjusted position.

2. A basic gage unit adapted for use with cooperating gage units having work contacting gaging members to provide a flush pin gage comprising a body having substantially flat and parallel top and bottom surfaces, a bore extending through said body along a line perpendicular to said surfaces, a pin slidably mounted in said bore and having a gaging surface at its upper end, said top surface of said body comprising a gaging surface cooperating with said gaging surface on said pin, said pin having a threaded hole extending axially therethrough, and an adjusting screw threadedly engaged in said hole, said adjusting screw being accessible for adjustment through the upper open end of said hole and being adjustable to a position wherein the lower end of said screw projects outwardly beyond the lower end of said pin and including a locking screw threadedly engaged in said threaded opening and disposed above said adjusting screw, said locking screw being accessible through the upper open end of said threaded opening and being advanceable into engagement with the upper end of said adjusting screw to lock said adjusting screw in place.

3. A flush pin gage comprising a body having a gaging surface, said body also having a base surface extending in a plane parallel to said gaging surface, a bore extending through said body along a line perpendicular to said surfaces, said bore extending to said surfaces, a pin slidably arranged within said bore, means preventing said pin from rotating within said bore, said pin having an axially extending threaded opening therethrough, an adjusting screw threadedly engaged in said opening, said adjusting screw being accessible through the end of said pin adjacent said gaging surface of said body and being adjustable to a position wherein one end of said screw projects beyond the end of said pin adjacent said base surface, the opposite end of said pin comprising a gaging surface cooperable with said gaging surface on said body, a base member having a flat supporting surface, said body being positioned on said base member with the base surface thereof contacting said supporting surface of said base member in co-planar relation, means fixedly and removably connecting said body with said base member, said base member having an axially slidable plunger therein, said plunger being axially aligned with said bore and having one end thereof projecting through said supporting surface and engageable with said projecting end of said screw in end-to-end contacting relation whereby when said screw is turned while in engagement with said end of said plunger the distance between said gaging surface of said pin and the opposite end of said plunger may be adjusted to a desired dimension, said opposite end of said plunger being projectable to a position exteriorly of said base member.

4. The combination set forth in claim 3 including means for limiting the axial movement of said pin in said body in a direction towards said base surface to a position wherein the end of said pin opposite said gaging surface is disposed within said bore and means for limiting the axial movement of said plunger in said base member.

5. The combination set forth in claim 3 wherein said pin is shorter in length than the perpendicular distance between said gaging and base surfaces of said body.

References Cited in the file of this patent

UNITED STATES PATENTS

| | | |
|---|---|---|
| 941,297 | Barthelmes | Nov. 23, 1909 |
| 1,386,027 | Reynolds | Aug. 2, 1921 |
| 2,339,699 | Husband | Jan. 18, 1944 |
| 2,445,176 | Hoffman | July 13, 1948 |
| 2,445,875 | Emery | July 27, 1948 |
| 2,466,185 | Stoothoff | Apr. 5, 1949 |
| 2,514,794 | Prince | July 11, 1950 |
| 2,560,177 | Kessler | July 10, 1951 |
| 2,597,030 | Pistoles | May 10, 1952 |